(12) United States Patent
Halen et al.

(10) Patent No.: US 11,297,280 B2
(45) Date of Patent: Apr. 5, 2022

(54) ARRANGEMENT FOR ADJUSTING AMPLIFICATION

(71) Applicant: Teleste Oyj, Littoinen (FI)

(72) Inventors: Sami Halen, Kaarina (FI); Sami Kuusisto, Turku (FI); Kari Mäki, Turku (FI); Anssi Mäkiranta, Masku (FI); Matti Susi, Lieto (FI)

(73) Assignee: Teleste OYJ, Littoinen (FI)

( * ) Notice: Subject to any disclaimer, the term of this patent is extended or adjusted under 35 U.S.C. 154(b) by 0 days.

(21) Appl. No.: 16/959,444

(22) PCT Filed: Jan. 18, 2018

(86) PCT No.: PCT/FI2018/050040
§ 371 (c)(1),
(2) Date: Jul. 1, 2020

(87) PCT Pub. No.: WO2019/141893
PCT Pub. Date: Jul. 25, 2019

(65) Prior Publication Data
US 2020/0374484 A1 Nov. 26, 2020

(51) Int. Cl.
*H04N 7/173* (2011.01)
*H04N 7/10* (2006.01)
(Continued)

(52) U.S. Cl.
CPC ......... *H04N 7/102* (2013.01); *H04N 21/6118* (2013.01); *H04N 21/6168* (2013.01); *H04N 21/64723* (2013.01); *H04N 21/64784* (2013.01)

(58) Field of Classification Search
CPC .......... H04N 21/6118; H04N 21/6168; H04N 21/64723; H04N 21/64784
(Continued)

(56) References Cited

U.S. PATENT DOCUMENTS 4,920,233 A * 4/1990 Kincaid ............... H01B 11/146
174/36
5,125,100 A * 6/1992 Katznelson ............ H04H 20/78
348/724
(Continued)

FOREIGN PATENT DOCUMENTS

EP 0928063 A2 7/1999
EP 1936977 A2 6/2008
(Continued)

*Primary Examiner* — Michael B. Pierorazio
(74) *Attorney, Agent, or Firm* — Mueting Raasch Group

(57) ABSTRACT

A network element of a cable television (CATV) network, comprising a first input for downstream signal transmission; a plurality of components arranged to form a downstream signal path, wherein at least one of said components is a downstream amplifier (330); a second input for upstream signal transmission; a plurality of components arranged to form an upstream signal path, wherein at least one of said components is an upstream amplifier (340); means (360) for inputting a control signal for adjusting one or more amplification parameters of the downstream amplifier; and means (350) for adjusting one or more amplification parameters of the upstream amplifier, wherein said one or more amplification parameters of the upstream amplifier are automatically calculated on the basis of the one or more amplification parameters of the downstream amplifier.

9 Claims, 2 Drawing Sheets

(51) Int. Cl.
*H04N 21/61* (2011.01)
*H04N 21/647* (2011.01)

(58) Field of Classification Search
USPC .......................................................... 725/127
See application file for complete search history.

(56) References Cited

U.S. PATENT DOCUMENTS

| | | | | |
|---|---|---|---|---|
| 5,399,927 A * | 3/1995 | Gruber | ...................... | H03F 3/72 327/379 |
| 5,481,389 A * | 1/1996 | Pidgeon | .................... | H03F 1/32 332/160 |
| 5,594,394 A * | 1/1997 | Sasaki | .................... | H01Q 21/28 333/103 |
| 5,604,528 A * | 2/1997 | Edwards | ................ | H04N 7/167 340/5.28 |
| 5,793,606 A * | 8/1998 | Cubbage | ............... | G06F 1/1601 361/679.29 |
| 5,834,697 A * | 11/1998 | Baker | .................... | H01B 11/02 174/113 R |
| 5,854,736 A * | 12/1998 | Fuhs | ..................... | G06F 1/1601 361/679.57 |
| 5,930,678 A * | 7/1999 | Alley | ........................ | H04N 7/10 725/146 |
| 6,466,913 B1 * | 10/2002 | Yasuda | .................... | G10L 21/00 704/270 |
| 6,721,371 B1 * | 4/2004 | Barham | ............. | H03H 17/0294 329/327 |
| 8,045,066 B2 * | 10/2011 | Vorenkamp | ............. | H03H 7/25 348/726 |
| 10,686,621 B1 * | 6/2020 | Frozenfar | ........... | H04L 12/2838 |
| 2001/0046268 A1 * | 11/2001 | Sharma | ..................... | H04J 1/05 375/324 |
| 2002/0056135 A1 * | 5/2002 | Sharma | .............. | H04N 7/17309 725/126 |
| 2004/0244053 A1 * | 12/2004 | Golombek | ......... | H04N 21/6118 725/127 |
| 2005/0056454 A1 * | 3/2005 | Clark | ..................... | H01B 11/02 174/113 R |
| 2006/0015921 A1 * | 1/2006 | Vaughan | ............ | H04M 7/006 725/127 |
| 2006/0094394 A1 * | 5/2006 | Yamamoto | ........... | H04B 1/0075 455/333 |
| 2006/0141976 A1 * | 6/2006 | Rohde | .................. | H03D 7/1441 455/326 |
| 2008/0227333 A1 * | 9/2008 | Hazani | .................. | H04B 3/542 439/578 |
| 2009/0196283 A1 * | 8/2009 | Kim | .................... | H04L 12/2872 370/352 |
| 2010/0017842 A1 * | 1/2010 | Wells | ..................... | H04N 7/104 725/149 |
| 2010/0100918 A1 * | 4/2010 | Egan, Jr | ................ | H04N 7/102 725/111 |
| 2010/0125877 A1 * | 5/2010 | Wells | ................. | H04N 21/6168 725/78 |
| 2010/0146564 A1 * | 6/2010 | Halik | .................... | H04N 7/104 725/78 |
| 2010/0211811 A1 * | 8/2010 | Zhou | ........................ | G06F 1/26 713/330 |
| 2010/0266000 A1 * | 10/2010 | Froimovich | ....... | H04N 21/6168 375/222 |
| 2010/0311277 A1 * | 12/2010 | Montena | ................ | H01R 24/44 439/638 |
| 2011/0154429 A1 * | 6/2011 | Stantchev | ............. | H01Q 11/10 725/149 |
| 2011/0199012 A1 * | 8/2011 | Lai | ....................... | H05B 41/282 315/219 |
| 2011/0304201 A1 * | 12/2011 | Sun | ........................ | B60R 16/03 307/10.1 |
| 2012/0151548 A1 * | 6/2012 | Rakib | ..................... | H04N 7/10 725/126 |
| 2013/0125193 A1 * | 5/2013 | Wells | ................. | H04N 21/6118 725/127 |
| 2013/0133019 A1 * | 5/2013 | Montena | ............. | H04N 21/61 725/127 |
| 2013/0227632 A1 * | 8/2013 | Wells | ................. | H04N 21/6168 725/127 |
| 2014/0033264 A1 * | 1/2014 | Li | ....................... | H04L 12/2801 725/127 |

FOREIGN PATENT DOCUMENTS

| | | |
|---|---|---|
| JP | H06113300 A | 4/1994 |
| JP | 2000152210 A | 5/2005 |
| WO | 2010045552 A1 | 4/2010 |
| WO | 2015124243 A1 | 8/2015 |
| WO | 2018005941 A1 | 1/2018 |

\* cited by examiner

ARRANGEMENT FOR ADJUSTING AMPLIFICATION

PRIORITY

This application is a U.S. national application of the international application number PCT/FI2018/050040 filed on Jan. 18, 2018, the contents of which are incorporated herein by reference.

FIELD OF THE INVENTION

The invention relates to cable television (CATV) networks, and especially to an arrangement for adjusting amplification.

BACKGROUND OF THE INVENTION

CATV networks may be implemented with various techniques and network topologies, but currently most cable television networks are implemented as so-called HFC networks (Hybrid Fiber Coax), i.e. as combinations of a fibre network and a coaxial cable network.

In HFC networks, return path (i.e. upstream) adjustment of a wideband amplifier is a challenging task and a common source of adjustment errors. Traditionally, amplification parameters of the return path, such as gain and slope, have been hand-adjusted by a service technician. Manual adjustment of return path might cause adjustment error or return path might be left totally unadjusted. False return path adjustment causes poor upstream transmission performance and degrades the QoS of the cable modem system. While forward path is typically correctly adjusted by field personnel, return path adjustment is too often neglected as its effect on cable modem system QoS may not be directly visible during installation.

BRIEF SUMMARY OF THE INVENTION

Now, an improved arrangement has been developed to reduce the above-mentioned problems. As aspects of the invention, we present a network element of a cable television network, which is characterized in what will be presented in the independent claims.

The dependent claims disclose advantageous embodiments of the invention.

According to an aspect of the invention, there is provided a network element of a cable television (CATV) network, said network element comprising a first input for downstream signal transmission; a plurality of components arranged to form a downstream signal path, wherein at least one of said components is a downstream amplifier; a second input for upstream signal transmission; a plurality of components arranged to form an upstream signal path, wherein at least one of said components is an upstream amplifier; means for inputting a control signal for adjusting one or more amplification parameters of the downstream amplifier; and means for adjusting one or more amplification parameters of the upstream amplifier, wherein said one or more amplification parameters of the upstream amplifier are automatically calculated on the basis of the one or more amplification parameters of the downstream amplifier.

According to an embodiment, said means for adjusting one or more amplification parameters of the upstream amplifier is arranged to continuously follow changes in values of the one or more amplification parameters of the downstream amplifier; and re-adjust the one or more amplification parameters of the upstream amplifier based on said changes.

According to an embodiment, said amplification parameters of the downstream amplifier used as a basis for calculating said amplification parameters of the upstream amplifier are gain and slope of the downstream amplifier.

According to an embodiment, the gain of the upstream amplifier is calculated according to $$\text{gain}(US) = A^*\text{gain}(DS) + B^*\text{slope}(DS) + C,$$

where gain(DS) and slope(DS) are the gain and slope of the downstream (forward path) amplifier and A and B are constants depending on a frequency band of the upstream signal path and C refers to one or more ambient factors.

According to an embodiment, the slope of the upstream amplifier is calculated according to $$\text{slope}(US) = D^*\text{gain}(DS) + E^*\text{slope}(DS) + F,$$

where gain(DS) and slope(DS) are the gain and slope of the downstream amplifier and D and E are constants depending on a frequency band of the upstream signal path and F refers to one or more ambient factors.

According to an embodiment, said means for adjusting the one or more amplification parameters of the upstream amplifier is arranged to use one or more of the following parameters upon calculating said ambient factors:
  operating temperature of the network element;
  application-specific correction values;
  type of plug-in modules used in the network element;
  information about usage of a power save mode.

According to an embodiment, the gain of the upstream amplifier is calculated according to $$\text{gain}(US) = \text{gain}(DS) - B^*\text{slope}(DS),$$

where gain(DS) and slope(DS) are the gain and slope of the downstream amplifier and B is a constant depending on a frequency band of the upstream signal path.

According to an embodiment, the slope of the upstream amplifier is calculated according to $$\text{slope}(US) = D^*\text{slope}(DS),$$

where slope(DS) is the slope of the downstream amplifier and D is a constant depending on a frequency band of the upstream signal path.

According to an embodiment, the network element further comprises a plurality of diplex filters, each of the diplex filters comprising bandpass filters for different downstream and upstream frequency bands.

According to an embodiment, said means for adjusting one or more amplification parameters of the upstream amplifier comprises a control circuit configured to detect the values of the one or more amplification parameters of the downstream amplifier and changes thereof and to adjust the one or more amplification parameters of the upstream amplifier based on the detected values.

These and other aspects, embodiments and advantages will be presented later in the detailed description of the invention.

BRIEF DESCRIPTION OF THE DRAWINGS

The invention will now be described in more detail in connection with preferred embodiments with reference to the appended drawings, in which.

DETAILED DESCRIPTION OF THE EMBODIMENTS

Figure 1:
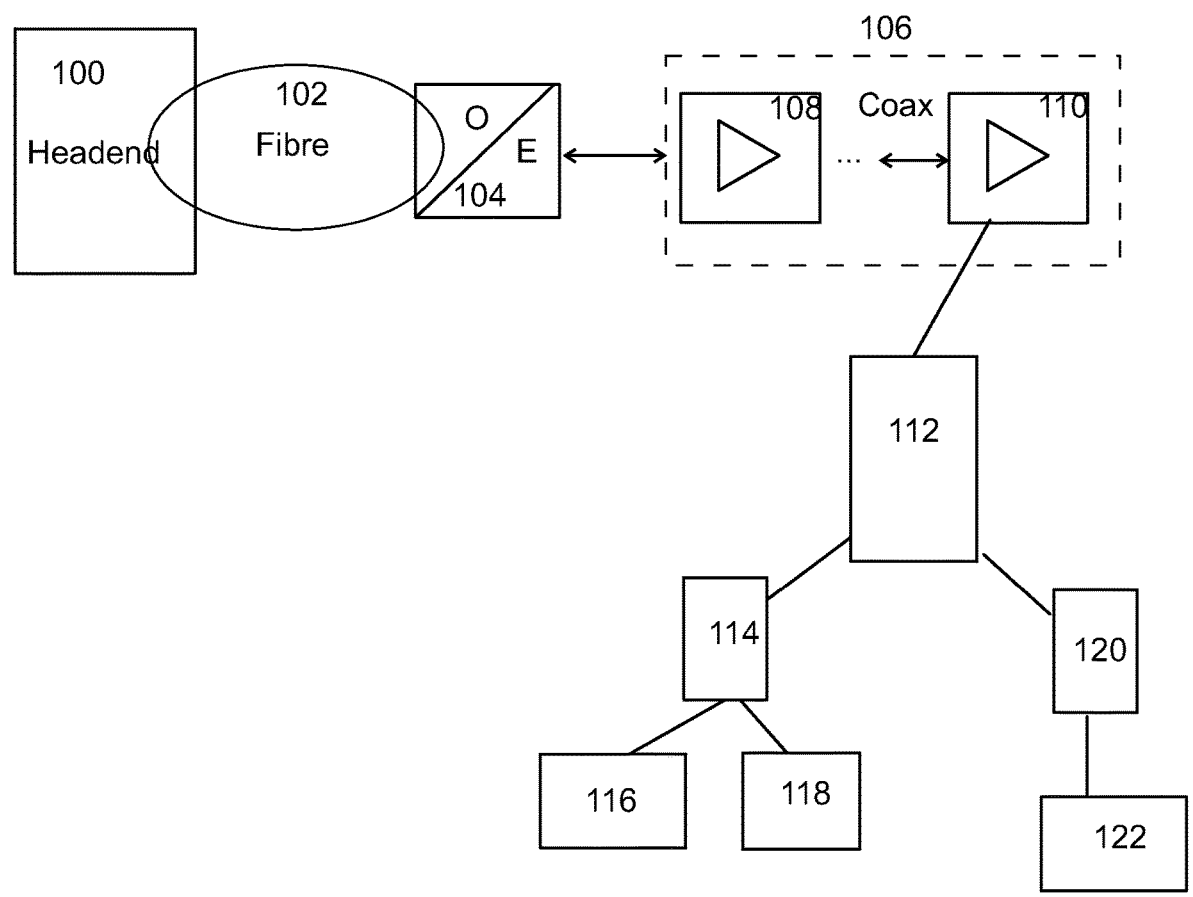
FIG. 1 shows the general structure of a typical HFC network.

FIG. 1 shows the general structure of a typical HFC network. Program services are introduced from the main amplifier 100 (a so-called headend) of the network via an optical fibre network 102 to a fibre node 104, which converts the optical signal to an electric signal to be relayed further in a coaxial cable network 106. Depending on the length, branching, topology, etc. of the coaxial cable network, this coaxial cable segment typically comprises one or more broadband amplifiers 108, 110 for amplifying program service signals in a heavily attenuating coaxial media. From the amplifier the program service signals are introduced to a cable network 112 of a smaller area, such as a distribution network of an apartment building, which are typically implemented as coaxial tree or star networks comprising signal splitters for distributing the program service signals to each customer. The cable network 112, such as the distribution network of an apartment, may further comprise a Network Interface Unit (NIU) arranged to divide downstream signals to appropriate home appliances. The NIU may operate as a home amplifier. From a wall outlet the signal is further relayed either via a cable modem 114 to a television receiver 116 or a computer 118, or via a so-called set-top box 120 to a television receiver 122.

The HFC network may be implemented according to various standards. In Europe, the HFC networks have traditionally been implemented according to DVB-C (Digital Video Broadcasting-Cable) standard, but currently there is an on-going shift to more widely use the DOCSIS (Data Over Cable Service Interface Specification) standard.

DOCSIS is a CATV standard providing specifications for high-bandwidth data transfer in an existing CATV system. DOCSIS may be employed to provide Internet access over existing hybrid fiber-coaxial (HFC) infrastructure of cable television operators. DOCSIS has been evolved through versions 1.0, 1.1, 2.0 and 3.0 to the latest version of 3.1.

When implementing the HFC network of FIG. 1 according to DOCSIS, the headend 100 of the CATV network comprises inputs for signals, such as TV signals and IP signals, a television signal modulator and a cable modem termination system (CMTS). The CMTS provides high-speed data services to customers thorough cable modems (CM; 114) locating in homes. The CMTS forms the interface to the IP-based network over the Internet. It modulates the data from the Internet for downstream transmission to homes and receives the upstream data from homes. The CMTS additionally manages the load balancing, error correction parameters and the class of service (CoS).

Signals from the headend 100 are distributed optically (fiber network 102) to within the vicinity of individual homes, where the optical signals are converted to electrical signals at the terminating points 104. The electrical signals are then distributed to the various homes via the existing 75 ohm coaxial cables 106. The maximum data transfer of the coaxial cables is limited due to strong frequency-based attenuation.

Therefore, the electrical signals transmitted over coaxial cables must be amplified. The amplifiers 108, 110 used for this purpose are suited to a specific frequency range. In addition, the upstream and downstream must occur over the same physical connection. The last part 112 of the coaxial connection between the CMTS and the CMs branches off in a star or a tree structure. A CMTS transmits the same data to all CMs located along the same section of cable (one-to-many communications). A request/grant mechanism exists between the CMTS and the CMs, meaning that a CM needing to transmit data must first send a request to the CMTS, after which it can transmit at the time assigned to it.

However, regardless of CATV standard underlying the HFC network, the operational principle of the RF amplifiers, such as the amplifiers 108, 110, is similar in that sense that they must be capable of two-way transmission and amplification of both downstream and upstream (a.k.a. forward path and return path) signals.

Figure 2:
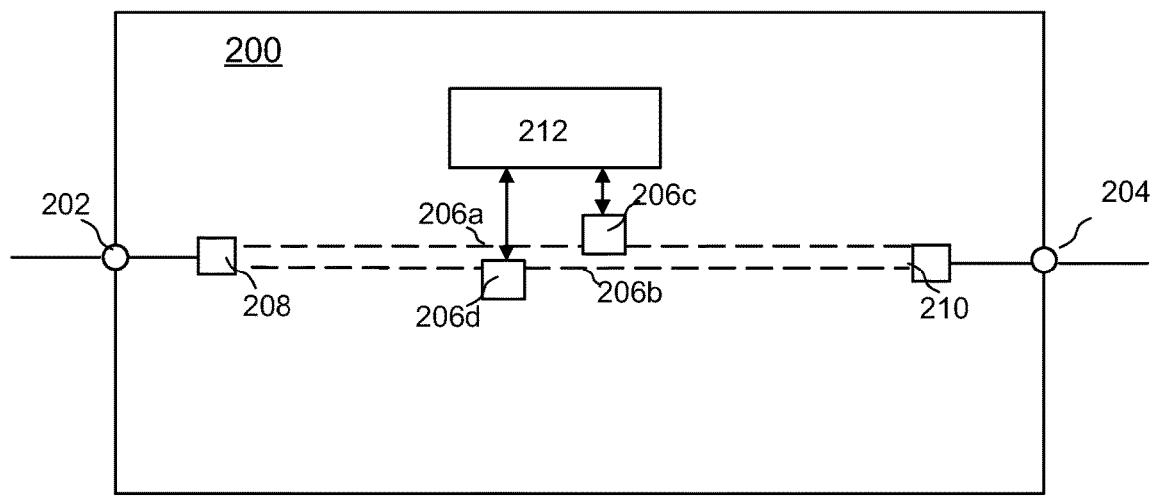
FIG. 2 shows a simplified block chart of a network element applicable in a HFC network.

FIG. 2 shows a simplified block chart of downstream and upstream signal paths in a typical RF amplifier used in HFC network. The amplifier 200 comprises a first input/output port 202, which operates as an input for the downstream (forward) signals originating from the headend or the CMTS and an output for the upstream (return) signals originating from the customer devices. The amplifier 200 further comprises a second input/output port 204, which operates as an output for the downstream (forward) signals originating from the headend or the CMTS and an input for the upstream (return) signals originating from the customer devices. Within the amplifier the downstream and upstream signals have their own signal routes 206a, 206b travelling at least partly through different components, including attenuators, signal inclination controllers, amplifiers, etc.

Regarding the implementation of the embodiments described further below, most of the internal structure of the network element is irrelevant, and therefore the internal structure is not described in further detail, but only depicted by the dotted lines 206a, 206b referring to the signal routes and components 206c, 206d referring to the components along the corresponding signal routes.

Regarding the first input/output port 202 and the downstream signals originating from the headend or the CMTS, there is at least one diplex filter 208 for directing the downstream and upstream signals to/from their own frequency bands. Similarly, regarding the second input/output port 204 and the upstream signals originating from the customer devices, there is at least one diplex filter 210 for directing the upstream and downstream signals to/from their own frequency bands.

The RF amplifier of FIG. 2 further comprises a control circuit 212 for obtaining control signals for adjusting the amplification parameters of the downstream and upstream amplifier units. Typically the control signals are supplied manually by a technician, either using a user interface of the RF amplifier or by connecting an external device to the RF amplifier.

In HFC networks, return path (i.e. upstream) adjustment of a wideband amplifier is a challenging task and a common source of adjustment errors. The return path adjustment of an HFC amplifier requires skill, tools and knowledge. Traditionally, amplification parameters of the return path, such as gain and slope, have been hand-adjusted by a service technician. Manual adjustment of return path might cause adjustment error or return path might be left totally unadjusted. False return path adjustment causes poor upstream transmission performance and degrades the cable modem system's Quality of Service. While forward path is typically correctly adjusted by field personnel, return path adjustment is too often neglected as its effect on cable modem system QoS may not be directly visible during installation.

Therefore, an improved procedure is needed for carrying out correct return path adjustment so as to improve the transmission performance of the HFC network.

According to an aspect, a network element of a cable television (CATV) network is now introduced, said network element comprising a first input for downstream signal transmission; a plurality of components arranged to form a downstream signal path, wherein at least one of said components is a downstream amplifier; a second input for upstream signal transmission; a plurality of components arranged to form an upstream signal path, wherein at least one of said components is an upstream amplifier; means for inputting a control signal for adjusting one or more amplification parameters of the downstream amplifier; and means for adjusting one or more amplification parameters of the upstream amplifier, wherein said one or more amplification parameters of the upstream amplifier are automatically calculated on the basis of the one or more amplification parameters of the downstream amplifier.

Hence, the implementation of the network element is based on an observation that the amplification parameters of the upstream amplifier can be adjusted on a sufficiently good level on the basis of the amplification parameters of the downstream amplifier. Thus, it is not necessary to manually adjust the amplification parameters of the upstream amplifier, but it suffices to adjust only the amplification parameters of the downstream amplifier. It is nevertheless noted that this does not preclude the option that the technician may continue adjusting manually the values of the amplification parameters of the upstream amplifier, for example fine tuning the values based on his/her skills and experience.

According to an embodiment, said means for adjusting one or more amplification parameters of the upstream amplifier is arranged to continuously follow changes in values of the one or more amplification parameters of the downstream amplifier, and to re-adjust the one or more amplification parameters of the upstream amplifier based on said changes. The continuous adjustment guarantees that return path will not be badly misadjusted even if the technician deliberately chooses not to adjust it or simply forgets the adjustment.

According to an embodiment, said amplification parameters of the downstream amplifier used as a basis for calculating said amplification parameters of the upstream amplifier are gain and slope of the downstream amplifier. Thus, the gain and slope of the return path may be continuously adjusted, for example, by an algorithm running in a control circuit, such as in an embedded microcontroller. The algorithm may calculate the return path gain and slope control values using the forward path gain and slope value as a basis.

According to an embodiment, the gain of the upstream (return path) amplifier is calculated according to $$\text{gain}(US) = A \cdot \text{gain}(DS) + B \cdot \text{slope}(DS) + C \quad (1.)$$

where gain(DS) and slope(DS) are the gain and slope of the downstream (forward path) amplifier and A and B are constants depending on a frequency band of the upstream signal path and C refers to one or more ambient factors described more in detail further below.

According to an embodiment, the slope of the upstream amplifier is calculated according to $$\text{slope}(US) = D \cdot \text{gain}(DS) + E \cdot \text{slope}(DS) + F \quad (2.)$$

where gain(DS) and slope(DS) are the gain and slope of the downstream amplifier and D and E are constants depending on a frequency band of the upstream signal path and F refers to one or more ambient factors described more in detail further below.

The above equations (1) and (2) provide the general form for the algorithm that may be used for calculating the return path gain and slope control values using the forward path gain and slope value as a basis and applying appropriate weights for the forward path gain and slope value. Optionally, one or more ambient factors may also be taken into consideration when calculating the return path gain and slope control values.

According to an embodiment, said means for adjusting the one or more amplification parameters of the upstream amplifier is arranged to use one or more of the following parameters upon calculating said amplification parameters:
 operating temperature of the network element;
 application-specific correction values;
 type of plug-in modules used in the network element;
 information about usage of a power save mode.

Thus, the above described ambient factors C and F may be approximated by using one or more of the above parameters. The applicability of the above parameters depends on various operation and installation conditions.

The operating temperature of the network element may preferably be considered, for example, when the ambient temperature upon installation of the network element is significantly different (hotter/cooler) than the average operating temperature of the network element. In such situation it may be assumed that the temperate difference in underground cables is less significant, and therefore a compensation factor may be applied.

The application-specific correction values may be applicable, for example, depending on whether the amplifier is used as a distribution amplifier or a trunk line amplifier. In a distribution amplifier, the downstream amplification parameters are typically on a higher level than in a trunk line amplifier. Thus, a part of the downstream gain may be neglected upon adjusting the upstream amplification parameters. Herein, the technician carrying out the installation may also manually provide adjusting factors for adjusting the amplifier to comply with a typical frequency response of the HFC network.

The network element may comprise a plurality of plug-in modules, each of which providing a different level attenuation on the downstream and/or upstream path. This effect may preferably be taken into consideration, as well.

The information about whether a power save mode is used in the amplifier provides also the information whether the amplifier is used as a distribution amplifier or a trunk line amplifier. In a distribution amplifier, the power save mode is typically not used, and this is preferably taken into consideration upon adjusting the upstream amplification parameters.

It is, however, noted that in many practical installation situations, the effect of the ambient factors is so negligible that they may be ignored and only the constants A, B, C and D are adjusted appropriately.

Thus, according to an embodiment, the gain of the upstream (return path) amplifier is calculated according to $$\text{gain}(US) = \text{gain}(DS) - B \cdot \text{slope}(DS) \quad (3.)$$

where gain(DS) and slope(DS) are the gain and slope of the downstream amplifier and B is a constant depending on a frequency band of the upstream signal path. Herein, constant A=1.

According to an embodiment, the slope of the upstream amplifier is calculated according to $$\text{slope}(US) = D * \text{slope}(DS) \quad (4.)$$

where slope (DS) is the slope of the downstream amplifier and D is a constant depending on a frequency band of the upstream signal path. Herein, constant C=0.

Hence, it has been observed that sufficiently good values for the return path gain and slope may be obtained, at the simplest, using the above equations (3) and (4). The return path gain may be calculated on the basis of the forward path gain and the forward path slope weighted with an appropriate first constant. The return path slope may be calculated on the basis of the forward path slope weighted with an appropriate second constant. Thus, it may be said that regarding the appropriate gain and slope of the amplifiers, the return follows the forward.

According to an embodiment, the network element further comprises a plurality of diplex filters, each of the diplex filters comprising bandpass filters for different downstream and upstream frequency bands. Thus, the network element may be used for various frequency band configurations, thereby for example anticipating an introduction of DOCSIS 3.1 whereupon the frequency ranges and the bandwidth of the downstream and upstream communication channels are adjusted to higher levels. The network element may comprise a switch for connecting the selected diplex filter so as to control the usage of desired downstream and upstream frequency bands. Upon changes in the downstream and upstream frequency bands, the above weights A, B, C and D naturally change accordingly.

According to an embodiment, said means for adjusting one or more amplification parameters of the upstream amplifier comprises a control circuit configured to detect the values of the one or more amplification parameters of the downstream amplifier and changes thereof and to adjust the one or more amplification parameters of the upstream amplifier based on the detected values.

The control circuit may be implemented for example as a FPGA or an ASIC and it may comprise a processor for executing various tasks. The control circuit may be configured to detect the values of the gain and slope of the downstream amplifier and their changes and to adjust the gain and slope of the upstream amplifier based on the detected values. The control circuit may further be configured to detect other parameters of the network element, for example the parameters mentioned above, and use one or more said parameters upon calculating the gain and slope of the upstream amplifier.

Figure 3:
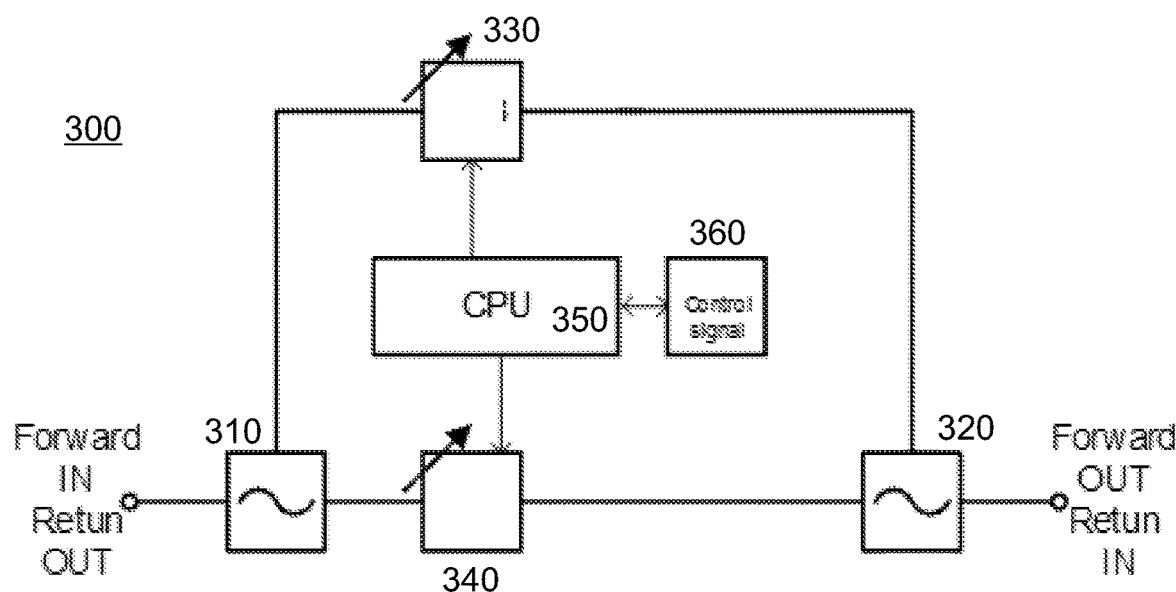
FIG. 3 shows a simplified block chart of a network element according to an embodiment of the invention.

FIG. 3 shows a simplified block chart for illustrating the embodiments. FIG. 3 shows a simplified block chart of a two-way wideband amplifier 300 comprising diplex filters 310,320 configured to route the return and the forward path signals to their respective signal paths within the amplifier. The amplifier comprises means 360 for inputting a control signal for adjusting the amplification parameters of the forward path amplifier, such as a user interface, for example push buttons, implemented within the amplifier. The control signal may also be supplied using an external device, such as a mobile device or laptop, connected to the amplifier. The user, such as a technician, may adjust the forward path amplification parameters by using said means 360 for inputting a control signal.

A control circuit 350, such as a CPU, receives the supplied control signals and adjusts one or more amplification parameters, such as gain and slope, of the forward path amplifier 330 accordingly. Simultaneously the control circuit 350 calculates values for one or more amplification parameters, such as gain and slope, of the return path on the basis of the values of the forward path amplification parameters and adjusts one or more amplification parameters, such as gain and slope, of the forward path amplifier 340 accordingly.

In general, the various embodiments may be implemented in hardware or special purpose circuits or any combination thereof. While various embodiments may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

A skilled person appreciates that any of the embodiments described above may be implemented as a combination with one or more of the other embodiments, unless there is explicitly or implicitly stated that certain embodiments are only alternatives to each other.

The various embodiments can be implemented with the help of computer program code that resides in a memory and causes the relevant apparatuses to carry out the invention. Thus, the implementation may include a computer readable storage medium stored with code thereon for use by an apparatus, such as the network element, which when executed by a processor, causes the apparatus to perform the various embodiments or a subset of them. Additionally or alternatively, the implementation may include a computer program embodied on a non-transitory computer readable medium, the computer program comprising instructions causing, when executed on at least one processor, at least one apparatus to apparatus to perform the various embodiments or a subset of them. For example, an apparatus may comprise circuitry and electronics for handling, receiving and transmitting data, computer program code in a memory, and a processor that, when running the computer program code, causes the apparatus to carry out the features of an embodiment.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A network element of a cable television (CATV) network, said network element comprising:
 a first input for downstream signal transmission;
 a plurality of components arranged to form a downstream signal path, wherein at least one of said components is a downstream amplifier;
 a second input for upstream signal transmission;
 a plurality of components arranged to form an upstream signal path, wherein at least one of said components is an upstream amplifier;
 an interface configured to input a control signal for adjusting one or more amplification parameters of the downstream amplifier; and
 a control circuit configured to adjust one or more amplification parameters of the upstream amplifier, wherein said one or more amplification parameters of the upstream amplifier are configured to be automatically calculated on the basis of gain and slope of the downstream amplifier.

2. The network element according to claim 1, wherein said control circuit is configured to continuously follow changes in values of the gain and slope of the downstream amplifier; and re-adjust the one or more amplification parameters of the upstream amplifier based on said changes.

3. The network element according to claim 1, wherein the gain of the upstream amplifier is configured to be calculated according to gain (US)=A*gain (DS)+B*slope (DS)+C where gain(DS) and slope(DS) are the gain and slope of the downstream amplifier and A and B are constants depending on a frequency band of the upstream signal path and C refers to one or more ambient factors.

4. The network element according to claim 1, wherein the slope of the upstream amplifier is configured to be calculated according to slope (US)=D*gain(DS)+E*slope (DS)+F where gain(DS) and slope(DS) are the gain and slope of the downstream amplifier and D and E are constants depending on a frequency band of the upstream signal path and F refers to one or more ambient factors.

5. The network element according to claim 3, wherein said control circuit is configured to use one or more of the following parameters upon calculating said ambient factors:
operating temperature of the network element;
application-specific correction values;
type of plug-in modules used in the network element;
information about usage of a power save mode.

6. The network element according to claim 1, wherein the gain of the upstream amplifier is configured to be calculated according to gain (US)=gain(DS)–B*slope(DS), where gain (DS) and slope(DS) are the gain and slope of the downstream amplifier and B is a constant depending on a frequency band of the upstream signal path.

7. The network element according to claim 1, wherein the slope of the upstream amplifier is configured to be calculated according to slope (US)=D*slope(DS), where slope(DS) is the slope of the downstream amplifier and D is a constant depending on a frequency band of the upstream signal path.

8. The network element according to claim 3, further comprising a plurality of diplex filters, each of the diplex filters comprising bandpass filters for different downstream and upstream frequency bands.

9. The network element according to claim 1, wherein said control circuit is configured to detect the values of the gain and slope of the downstream amplifier and changes thereof and to adjust the one or more amplification parameters of the upstream amplifier based on the detected values.

* * * * *